(12) United States Patent
O'Connor et al.

(10) Patent No.: US 11,851,204 B2
(45) Date of Patent: Dec. 26, 2023

(54) FUEL OXYGEN CONVERSION UNIT WITH A DUAL SEPARATOR PUMP

(71) Applicant: General Electric Company, Schenectady, NY (US)

(72) Inventors: Ethan Patrick O'Connor, Hamilton, OH (US); Daniel Alan Niergarth, Norwood, OH (US); Brandon Wayne Miller, Liberty Township, OH (US); Richard Alan Wesling, Cincinnati, OH (US); David Justin Brady, Rockport, MA (US)

(73) Assignee: General Electric Company, Schenectady, NY (US)

( * ) Notice: Subject to any disclaimer, the term of this patent is extended or adjusted under 35 U.S.C. 154(b) by 517 days.

(21) Appl. No.: 16/178,970

(22) Filed: Nov. 2, 2018

(65) Prior Publication Data

US 2020/0140111 A1    May 7, 2020

(51) Int. Cl.
*B64D 37/34* (2006.01)
*F02C 7/236* (2006.01)
(Continued)

(52) U.S. Cl.
CPC .............. *B64D 37/34* (2013.01); *F02C 7/222* (2013.01); *F02C 7/232* (2013.01); *F02C 7/236* (2013.01);
(Continued)

(58) Field of Classification Search
CPC ............... B01D 3/343; B01D 19/0005; B01D 19/0063; B01D 45/14; B01D 2257/104;
(Continued)

(56) References Cited

U.S. PATENT DOCUMENTS

| | | |
|---|---|---|
| 2,582,842 A | 1/1952 | Messinger |
| 2,720,313 A | 10/1955 | Pattison |

(Continued)

FOREIGN PATENT DOCUMENTS

| | | |
|---|---|---|
| EP | 2003311 A2 | 12/2008 |
| EP | 3018304 A1 | 5/2016 |

(Continued)

OTHER PUBLICATIONS

U.S. Appl. No. 15/819,327, filed Nov. 28, 2017.
(Continued)

*Primary Examiner* — Scott J Walthour
(74) *Attorney, Agent, or Firm* — Dority & Manning, P.A.

(57) ABSTRACT

A fuel delivery system for a gas turbine engine includes a fuel tank; a draw pump downstream of the fuel tank for generating a liquid fuel flow from the fuel tank; a main fuel pump downstream of the draw pump; and a fuel oxygen conversion unit downstream of the draw pump and upstream of the main fuel pump. The fuel oxygen conversion unit includes a stripping gas line; a contactor in fluid communication with the stripping gas line and the draw pump for forming a fuel/gas mixture; and a dual separator pump in fluid communication with the contactor for receiving the fuel/gas mixture and separating the fuel/gas mixture into a stripping gas flow and the liquid fuel flow at a location upstream of the main fuel pump.

20 Claims, 4 Drawing Sheets

(51) Int. Cl.
  *F02M 37/22* (2019.01)
  *B01D 19/00* (2006.01)
  *F02C 7/232* (2006.01)
  *F02C 7/22* (2006.01)
  *F02C 7/224* (2006.01)

(52) U.S. Cl.
  CPC ......... *F02M 37/22* (2013.01); *B01D 19/0063* (2013.01); *B01D 2257/104* (2013.01); *F02C 7/224* (2013.01); *F05D 2210/13* (2013.01); *F05D 2260/213* (2013.01)

(58) Field of Classification Search
  CPC . B64D 37/34; F01M 2013/0422; F02C 7/236; F04D 31/00; F23K 2900/05082; F23R 2900/00004
  See application file for complete search history.

(56) References Cited

U.S. PATENT DOCUMENTS

| | | |
|---|---|---|
| 2,893,628 A | 7/1959 | Herman |
| 3,050,240 A | 8/1962 | Darnell |
| 3,178,105 A | 4/1965 | Darnell |
| 3,590,559 A | 7/1971 | Bragg |
| 3,847,298 A | 11/1974 | Hamilton |
| 3,895,243 A | 7/1975 | Amend et al. |
| 3,902,658 A | 9/1975 | Madsen |
| 4,169,567 A | 10/1979 | Tamura |
| 4,170,116 A | 10/1979 | Williams |
| 4,449,372 A | 5/1984 | Rilett |
| 4,503,682 A | 3/1985 | Rosenblatt |
| 4,505,124 A | 3/1985 | Mayer |
| 4,550,573 A | 11/1985 | Rannenberg |
| 4,600,413 A | 7/1986 | Sugden |
| 4,714,139 A | 12/1987 | Lorenz et al. |
| 4,738,779 A | 4/1988 | Carroll et al. |
| 4,755,197 A | 7/1988 | Benson et al. |
| 4,773,212 A | 9/1988 | Griffin et al. |
| 5,149,018 A | 9/1992 | Clark |
| 5,267,608 A | 12/1993 | Coffinberry |
| 5,341,636 A | 8/1994 | Paul |
| 5,452,573 A | 9/1995 | Glickstein et al. |
| 5,587,068 A | 12/1996 | Aho, Jr. et al. |
| 5,622,621 A | 4/1997 | Kramer |
| 5,667,168 A | 9/1997 | Fluegel |
| 5,722,241 A | 3/1998 | Huber |
| 5,724,806 A | 3/1998 | Homer |
| 5,904,836 A | 5/1999 | Lee et al. |
| 6,134,876 A | 10/2000 | Hines et al. |
| 6,182,435 B1 | 2/2001 | Niggemann et al. |
| 6,250,097 B1 | 6/2001 | Lui et al. |
| 6,294,091 B1 | 9/2001 | Hoff |
| 6,415,595 B1 | 7/2002 | Wilmot, Jr. et al. |
| 6,435,454 B1 | 8/2002 | Engelhardt |
| 6,701,717 B2 | 3/2004 | Flatman et al. |
| 6,702,729 B2 | 3/2004 | Mazzuca |
| 6,892,710 B2 | 5/2005 | Ekstam |
| 6,939,392 B2 | 9/2005 | Huang et al. |
| 7,093,437 B2 | 8/2006 | Spadaccini et al. |
| 7,260,926 B2 | 8/2007 | Sabatino et al. |
| 7,334,407 B2 | 2/2008 | Spadaccini et al. |
| 7,377,098 B2 | 5/2008 | Walker et al. |
| 7,387,602 B1 | 6/2008 | Kirsch |
| 7,398,641 B2 | 7/2008 | Stretton et al. |
| 7,431,818 B2 | 10/2008 | Cipollini |
| 7,459,081 B2 | 12/2008 | Koenig et al. |
| 7,536,851 B2 | 5/2009 | McLain |
| 7,569,099 B2 | 8/2009 | Coffin et al. |
| 7,628,965 B2 | 12/2009 | Johnson et al. |
| 7,694,916 B2 | 4/2010 | Limaye et al. |
| 7,735,670 B2 | 6/2010 | Zaki et al. |
| 7,744,827 B2 | 6/2010 | Vanderspurt et al. |
| 7,824,470 B2 | 11/2010 | Chiappetta et al. |
| 7,836,680 B2 | 11/2010 | Schwarz et al. |
| 7,882,704 B2 | 2/2011 | Chen |
| 7,896,292 B2 | 3/2011 | Limaye et al. |
| 7,905,259 B2 | 3/2011 | Johnson et al. |
| 7,966,807 B2 | 6/2011 | Norris et al. |
| 7,987,676 B2 | 8/2011 | Ast et al. |
| 8,055,437 B2 | 11/2011 | Proietty et al. |
| 8,141,360 B1 | 3/2012 | Huber |
| 8,177,884 B2 | 5/2012 | Schmidt et al. |
| 8,231,714 B2 | 7/2012 | Cornet et al. |
| 8,261,528 B2 | 9/2012 | Chillar et al. |
| 8,388,830 B2 | 3/2013 | Sohn et al. |
| 8,450,020 B2 | 5/2013 | Sinha et al. |
| 8,499,567 B2 | 8/2013 | Hagh et al. |
| 8,499,822 B2 | 8/2013 | Bulin et al. |
| 8,522,572 B2 | 9/2013 | Coffinberry et al. |
| 8,602,362 B2 | 12/2013 | Buchwald |
| 8,663,996 B2 | 3/2014 | Beeson |
| 8,765,070 B2 | 7/2014 | Norton et al. |
| 8,789,377 B1 | 7/2014 | Brostmeyer |
| 8,821,362 B2 | 9/2014 | Kidd et al. |
| 8,828,344 B2 | 9/2014 | K-WLam et al. |
| 8,858,161 B1 | 10/2014 | Ryznic et al. |
| 8,944,367 B2 | 2/2015 | Bystry, Jr. et al. |
| 8,978,353 B2 | 3/2015 | Norton et al. |
| 8,984,884 B2 | 3/2015 | Xu et al. |
| 9,014,791 B2 | 4/2015 | Held |
| 9,038,397 B2 | 5/2015 | Papa et al. |
| 9,120,580 B2 | 9/2015 | Sampath |
| 9,144,768 B2 | 9/2015 | Tichborne et al. |
| 9,162,162 B2 | 10/2015 | Yount |
| 9,231,267 B2 | 1/2016 | McAlister |
| 9,435,246 B2 | 9/2016 | Devarakonda |
| 9,567,095 B2 | 2/2017 | McCarthy et al. |
| 9,580,185 B2 | 2/2017 | Rhoden et al. |
| 9,656,187 B2 | 5/2017 | Lo et al. |
| 9,687,773 B2 | 6/2017 | Johnson et al. |
| 9,724,625 B2 | 8/2017 | Lo |
| 9,752,507 B2 | 9/2017 | Selstad et al. |
| 9,771,867 B2 | 9/2017 | Karam et al. |
| 9,834,315 B2 | 12/2017 | Lo et al. |
| 9,863,322 B2 | 1/2018 | Williams |
| 9,885,290 B2 | 2/2018 | Della-Fera et al. |
| 9,897,054 B2 | 2/2018 | Lo et al. |
| 10,215,097 B2 | 2/2019 | Miller et al. |
| 2009/0133380 A1 | 5/2009 | Donnerhack |
| 2009/0158739 A1 | 6/2009 | Messmer |
| 2009/0188234 A1 | 7/2009 | Suciu et al. |
| 2010/0212857 A1 | 8/2010 | Bulin et al. |
| 2010/0313591 A1 | 12/2010 | Lents et al. |
| 2011/0262309 A1 | 10/2011 | Limaye et al. |
| 2012/0216502 A1 | 8/2012 | Freund et al. |
| 2012/0216677 A1 | 8/2012 | Koenig et al. |
| 2013/0186100 A1 | 7/2013 | Rhoden et al. |
| 2014/0165570 A1 | 6/2014 | Herring |
| 2014/0205446 A1 | 7/2014 | Patsouris et al. |
| 2014/0345292 A1 | 11/2014 | Diaz et al. |
| 2014/0360153 A1 | 12/2014 | Papa et al. |
| 2015/0000291 A1 | 1/2015 | Smith et al. |
| 2015/0040986 A1 | 2/2015 | Tichborne et al. |
| 2015/0072850 A1 | 3/2015 | Derrick et al. |
| 2015/0159867 A1 | 6/2015 | Patrick et al. |
| 2016/0003160 A1 | 1/2016 | Hagshenas |
| 2016/0096629 A1 | 4/2016 | Vaisman |
| 2016/0108814 A1 | 4/2016 | Schmitz |
| 2016/0138431 A1 | 5/2016 | Lear, Jr. |
| 2016/0167802 A1 | 6/2016 | Lo et al. |
| 2016/0208759 A1 | 7/2016 | Lo et al. |
| 2016/0245144 A1 | 8/2016 | Selberg et al. |
| 2016/0290214 A1 | 10/2016 | Ekanayake et al. |
| 2016/0305440 A1 | 10/2016 | Laboda et al. |
| 2016/0369700 A1 | 12/2016 | Ribarov et al. |
| 2017/0030266 A1 | 2/2017 | Cerny et al. |
| 2017/0096910 A1 | 4/2017 | Raimarckers et al. |
| 2017/0113807 A1 | 4/2017 | Burnell et al. |
| 2017/0114721 A1 | 4/2017 | Miller et al. |
| 2017/0141419 A1 | 5/2017 | Wu et al. |
| 2017/0159566 A1 | 6/2017 | Sennoun et al. |
| 2017/0167382 A1 | 6/2017 | Miller et al. |
| 2017/0291714 A1 | 10/2017 | Corman |

(56) References Cited

U.S. PATENT DOCUMENTS

| | | |
|---|---|---|
| 2017/0356347 A1* | 12/2017 | Scothern .................. F02C 7/06 |
| 2018/0016025 A1 | 1/2018 | Rheaume et al. |
| 2018/0056233 A1 | 3/2018 | Henson et al. |
| 2018/0056234 A1 | 3/2018 | Weng et al. |
| 2018/0071659 A1 | 3/2018 | Rhoden |
| 2018/0118367 A1 | 5/2018 | Rheaume et al. |
| 2018/0313271 A1* | 11/2018 | Chalaud .................. F02C 7/236 |
| 2020/0086239 A1 | 3/2020 | Cordatos et al. |

FOREIGN PATENT DOCUMENTS

| | | |
|---|---|---|
| EP | 3075957 A1 | 10/2016 |
| EP | 3623030 A1 | 3/2020 |
| GB | 2136880 A | 9/1984 |
| GB | 2204361 A | 11/1988 |
| JP | S5932893 U | 2/1984 |
| WO | WO 02/16743 A1 | 2/2002 |
| WO | WO2002/038938 A1 | 5/2002 |
| WO | WO2006/079438 A1 | 8/2006 |
| WO | WO2011/038188 A1 | 3/2011 |

OTHER PUBLICATIONS

U.S. Appl. No. 15/819,443, filed Nov. 21, 2017.
Landfill, Sewage, Biogas, Coal, Seam & Mines Gas Separation/Filtration, Kelburn Engineering—LandfillGas and Air Separation, 3 pages. www.kelburneng.com.uk//landfill-gas-bio-gas-sewer-gas.php.

* cited by examiner

FUEL OXYGEN CONVERSION UNIT WITH A DUAL SEPARATOR PUMP

FIELD

The present subject matter relates generally to a fuel oxygen conversion unit for an engine and a method of operating the same.

BACKGROUND

Typical aircraft propulsion systems include one or more gas turbine engines. The gas turbine engines generally include a turbomachine, the turbomachine including, in serial flow order, a compressor section, a combustion section, a turbine section, and an exhaust section. In operation, air is provided to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gasses through the turbine section drives the turbine section and is then routed through the exhaust section, e.g., to atmosphere.

Certain operations and systems of the gas turbine engines and aircraft may generate a relatively large amount of heat. Fuel has been determined to be an efficient heat sink to receive at least some of such heat during operations due at least in part to its heat capacity and an increased efficiency in combustion operations that may result from combusting higher temperature fuel.

However, heating the fuel up without properly conditioning the fuel may cause the fuel to "coke," or form solid particles that may clog up certain components of the fuel system, such as the fuel nozzles. Reducing an amount of oxygen in the fuel may effectively reduce the likelihood that the fuel will coke beyond an unacceptable amount. Fuel oxygen conversion systems have been proposed for such a purpose.

However, the inventors of the present disclosure have found that the inclusion of a fuel oxygen conversion system may increase an amount of mechanical energy required to run a fuel delivery system including the fuel oxygen conversion system. Accordingly, a fuel delivery system having a fuel oxygen conversion system implemented without overly burdening a mechanical energy draw of the fuel delivery system would be useful.

BRIEF DESCRIPTION

Aspects and advantages of the invention will be set forth in part in the following description, or may be obvious from the description, or may be learned through practice of the invention.

In one exemplary embodiment of the present disclosure, a fuel delivery system for a gas turbine engine is provided. The fuel delivery system includes a fuel tank; a draw pump downstream of the fuel tank for generating a liquid fuel flow from the fuel tank; a main fuel pump downstream of the draw pump; and a fuel oxygen conversion unit downstream of the draw pump and upstream of the main fuel pump. The fuel oxygen conversion unit includes a stripping gas line; a contactor in fluid communication with the stripping gas line and the draw pump for forming a fuel/gas mixture; and a dual separator pump in fluid communication with the contactor for receiving the fuel/gas mixture and separating the fuel/gas mixture into a stripping gas flow and the liquid fuel flow at a location upstream of the main fuel pump.

In certain exemplary embodiments the dual separator pump defines a liquid fuel outlet pressure during operation, wherein the liquid fuel outlet pressure is at least about 70 pounds per square inch.

In certain exemplary embodiments the dual separator pump of the fuel oxygen conversion unit provides substantially all of a pressure rise of the fuel flow within the fuel delivery system downstream of the draw pump and upstream of the main fuel pump.

In certain exemplary embodiments dual separator pump generates a pressure rise in the fuel flow of at least about 60 pounds per square inch.

In certain exemplary embodiments the dual separator pump includes a single stage separator/pump assembly.

In certain exemplary embodiments the dual separator pump is a rotary pump defining an axis and a radial direction, wherein the dual separator pump includes a gas filter extending generally along the axis and a plurality of paddles positioned outward of the gas filter along the radial direction and rotatable about the axis.

In certain exemplary embodiments the dual separator pump defines a radial direction, a fuel/gas mixture inlet, and a liquid fuel outlet, wherein the liquid fuel outlet is positioned outward of the fuel gas mixture inlet along the radial direction.

In certain exemplary embodiments draw pump is mechanically coupled to and rotatable with the main fuel pump.

In certain exemplary embodiments substantially all of the fuel flow from the draw pump to the main fuel pump flows through the dual separator pump of the fuel oxygen conversion unit.

In certain exemplary embodiments substantially all of the fuel flow from the draw pump to the main fuel pump flows through the dual separator pump of the fuel oxygen conversion unit without option for bypass.

In certain exemplary embodiments the fuel oxygen conversion unit further includes a gas boost pump and a catalyst, and wherein the stripping gas line of the fuel oxygen conversion unit defines at least in part a circulation gas path for a flow stripping gas of the fuel oxygen conversion unit.

In another exemplary embodiment of the present disclosure, a fuel delivery system for a gas turbine engine is provided. The fuel delivery system includes a fuel oxygen conversion unit. The fuel oxygen conversion unit includes a contactor defining a liquid fuel inlet for receiving a liquid fuel flow and a stripping gas inlet for receiving a stripping gas flow, the contactor configured to form a fuel/gas mixture; and a dual separator pump defining an inlet in fluid communication with the contactor for receiving the fuel/gas mixture, a liquid fuel outlet, and a stripping gas outlet, the dual separator pump configured to separate the fuel/gas mixture back into the stripping gas flow and the liquid fuel flow and provide the stripping gas flow to the stripping gas outlet and the liquid fuel flow to the liquid fuel outlet, the dual separator pump defining a pressure differential between the liquid fuel flow at the liquid fuel outlet and the liquid fuel flow at the liquid fuel inlet of the contactor of at least about 60 pounds per square inch.

In certain exemplary embodiments the dual separator pump includes a single stage separator/pump assembly.

In certain exemplary embodiments the fuel delivery system further includes a draw pump; and a main fuel pump, wherein the fuel oxygen conversion unit is positioned downstream of the draw pump and upstream of the main fuel pump.

For example, in certain exemplary embodiments the dual separator pump of the fuel oxygen conversion unit provides substantially all of a pressure rise of the liquid fuel flow between the draw pump in the main fuel pump.

In certain exemplary embodiments the pressure differential is at least about 90 pounds per square inch and up to about 750 pounds per square inch.

In certain exemplary embodiments the dual separator pump is a mechanically-driven dual separator pump.

In an exemplary aspect of the present disclosure, a method is provided for operating a fuel delivery system for a gas turbine engine. The method includes mixing in a contactor of a fuel oxygen conversion unit a liquid fuel flow received from a draw pump with a stripping gas flow to form a fuel/gas mixture; receiving the fuel/gas mixture in a dual separator pump of the fuel oxygen conversion unit; and separating the fuel/gas mixture back into the liquid fuel flow and the stripping gas flow and increasing a pressure of the liquid fuel flow at least about 60 pounds per square inch with the dual separator pump.

In certain exemplary aspects the method further includes increasing the pressure of the liquid fuel flow from a fuel tank using the draw pump; and increasing the pressure of the liquid fuel flow downstream of the fuel oxygen conversion unit with a main fuel pump; wherein separating the fuel/gas mixture back into the liquid fuel flow and the stripping gas flow and increasing the pressure of the liquid fuel flow includes providing substantially all of a pressure rise of the liquid fuel flow between the draw pump and the main fuel pump.

In certain exemplary aspects separating the fuel/gas mixture back into the liquid fuel flow and the stripping gas flow and increasing the pressure of the liquid fuel flow includes separating the fuel/gas mixture back into the liquid fuel flow and the stripping gas flow and increasing the pressure of the liquid fuel flow with the dual separator pump simultaneously in a single stage of the dual separator pump.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
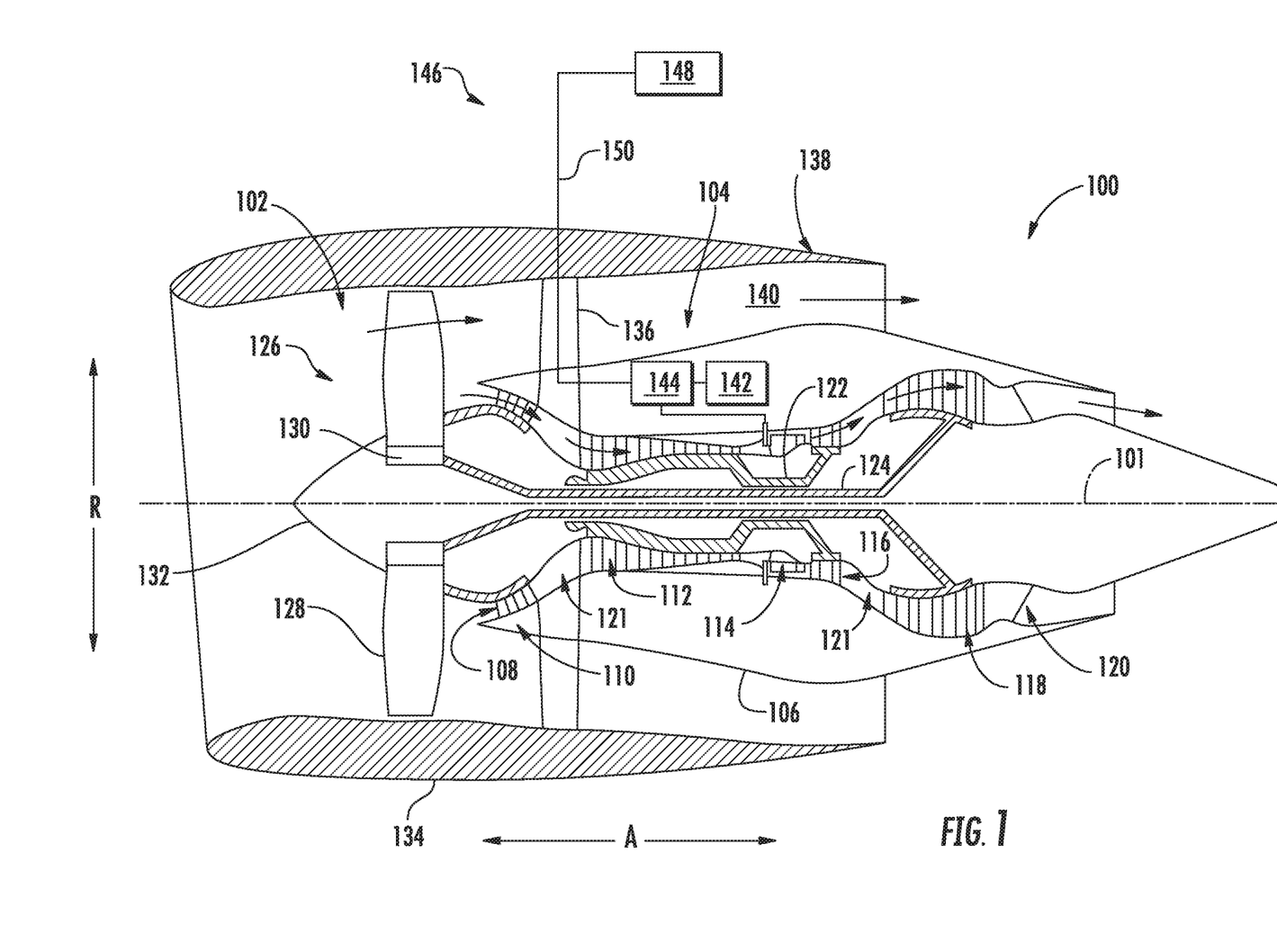
FIG. 1 is a schematic, cross-sectional view of a gas turbine engine in accordance with an exemplary embodiment of the present disclosure.

Referring now to the drawings, wherein identical numerals indicate the same elements throughout the figures, FIG. 1 provides a schematic, cross-sectional view of an engine in accordance with an exemplary embodiment of the present disclosure. The engine may be incorporated into a vehicle. For example, the engine may be an aeronautical engine incorporated into an aircraft. Alternatively, however, the engine may be any other suitable type of engine for any other suitable aircraft.

For the embodiment depicted, the engine is configured as a high bypass turbofan engine 100. As shown in FIG. 1, the turbofan engine 100 defines an axial direction A (extending parallel to a longitudinal centerline 101 provided for reference), a radial direction R, and a circumferential direction (extending about the axial direction A; not depicted in FIG. 1). In general, the turbofan 100 includes a fan section 102 and a turbomachine 104 disposed downstream from the fan section 102.

The exemplary turbomachine 104 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a high pressure (HP) turbine 116 and a low pressure (LP) turbine 118; and a jet exhaust nozzle section 120. The compressor section, combustion section 114, and turbine section together define at least in part a core air flowpath 121 extending from the annular inlet 108 to the jet nozzle exhaust section 120. The turbofan engine further includes one or more drive shafts. More specifically, the turbofan engine includes a high pressure (HP) shaft or spool 122 drivingly connecting the HP turbine 116 to the HP compressor 112, and a low pressure (LP) shaft or spool 124 drivingly connecting the LP turbine 118 to the LP compressor 110.

For the embodiment depicted, the fan section 102 includes a fan 126 having a plurality of fan blades 128 coupled to a disk 130 in a spaced apart manner. The fan blades 128 and disk 130 are together rotatable about the longitudinal axis 201 by the LP shaft 124. The disk 130 is covered by rotatable front hub 132 aerodynamically contoured to promote an airflow through the plurality of fan blades 128. Further, an annular fan casing or outer nacelle 134 is provided, circumferentially surrounding the fan 126 and/or at least a portion of the turbomachine 104. The nacelle 134 is supported relative to the turbomachine 104 by a plurality of circumferentially-spaced outlet guide vanes 136. A downstream section 138 of the nacelle 134 extends over an outer portion of the turbomachine 104 so as to define a bypass airflow passage 140 therebetween.

Referring still to FIG. 1, the turbofan engine 100 additionally includes an accessory gearbox 142, a fuel oxygen conversion unit 144, and a fuel delivery system 146. For the embodiment shown, the accessory gearbox 142 is located within the cowling/outer casing 106 of the turbomachine 104. Additionally, it will be appreciated that, although not depicted schematically in FIG. 1, the accessory gearbox 142 may be mechanically coupled to, and rotatable with, one or more shafts or spools of the turbomachine 104. For example, in at least certain exemplary embodiments, the accessory gearbox 142 may be mechanically coupled to, and rotatable with, the HP shaft 122. Further, for the embodiment shown, the fuel oxygen conversion unit 144 is coupled to, or otherwise rotatable with, the accessory gearbox 142. In such a manner, it will be appreciated that the exemplary fuel oxygen conversion unit 144 is driven by the accessory gearbox 142. Notably, as used herein, the term "fuel oxygen conversion" generally means a device capable of reducing a free oxygen content of the fuel.

Moreover, the fuel delivery system 146 generally includes a fuel source 148, such as a fuel tank, and one or more fuel lines 150. The one or more fuel lines 150 provide a fuel flow through the fuel delivery system 146 to the combustion section 114 of the turbomachine 104 of the turbofan engine 100. A more detailed schematic of a fuel delivery system in accordance with an exemplary embodiment of the present disclosure is provided below with reference to FIG. 3.

It will be appreciated, however, that the exemplary turbofan engine 100 depicted in FIG. 1 is provided by way of example only. In other exemplary embodiments, any other suitable engine may be utilized with aspects of the present disclosure. For example, in other embodiments, the engine may be any other suitable gas turbine engine, such as a turboshaft engine, turboprop engine, turbojet engine, etc. In such a manner, it will further be appreciated that in other embodiments the gas turbine engine may have any other suitable configuration, such as any other suitable number or arrangement of shafts, compressors, turbines, fans, etc.

Further, although the exemplary gas turbine engine depicted in FIG. 1 is shown schematically as a direct drive, fixed-pitch turbofan engine 100, in other embodiments, a gas turbine engine of the present disclosure may be a geared gas turbine engine (i.e., including a gearbox between the fan 126 and shaft driving the fan, such as the LP shaft 124), may be a variable pitch gas turbine engine (i.e., including a fan 126 having a plurality of fan blades 128 rotatable about their respective pitch axes), etc. Further, although not depicted herein, in other embodiments the gas turbine engine may be any other suitable type of gas turbine engine, such as an industrial gas turbine engine incorporated into a power generation system, a nautical gas turbine engine, etc. Further, still, in alternative embodiments, aspects of the present disclosure may be incorporated into, or otherwise utilized with, any other type of engine, such as reciprocating engines.

Moreover, it will be appreciated that although for the embodiment depicted, the turbofan engine 100 includes the fuel oxygen conversion unit 144 positioned within the turbomachine 104, i.e., within the casing 106 of the turbomachine 104, in other embodiments, the fuel oxygen conversion unit 144 may be positioned at any other suitable location. For example, in other embodiments, the fuel oxygen conversion unit 144 may instead be positioned remote from the turbofan engine 100. Additionally, in other embodiments, the fuel oxygen conversion unit 144 may additionally or alternatively be driven by other suitable power sources such as an electric motor, a hydraulic motor, or an independent mechanical coupling to the HP or LP shaft, etc.

Figure 2:
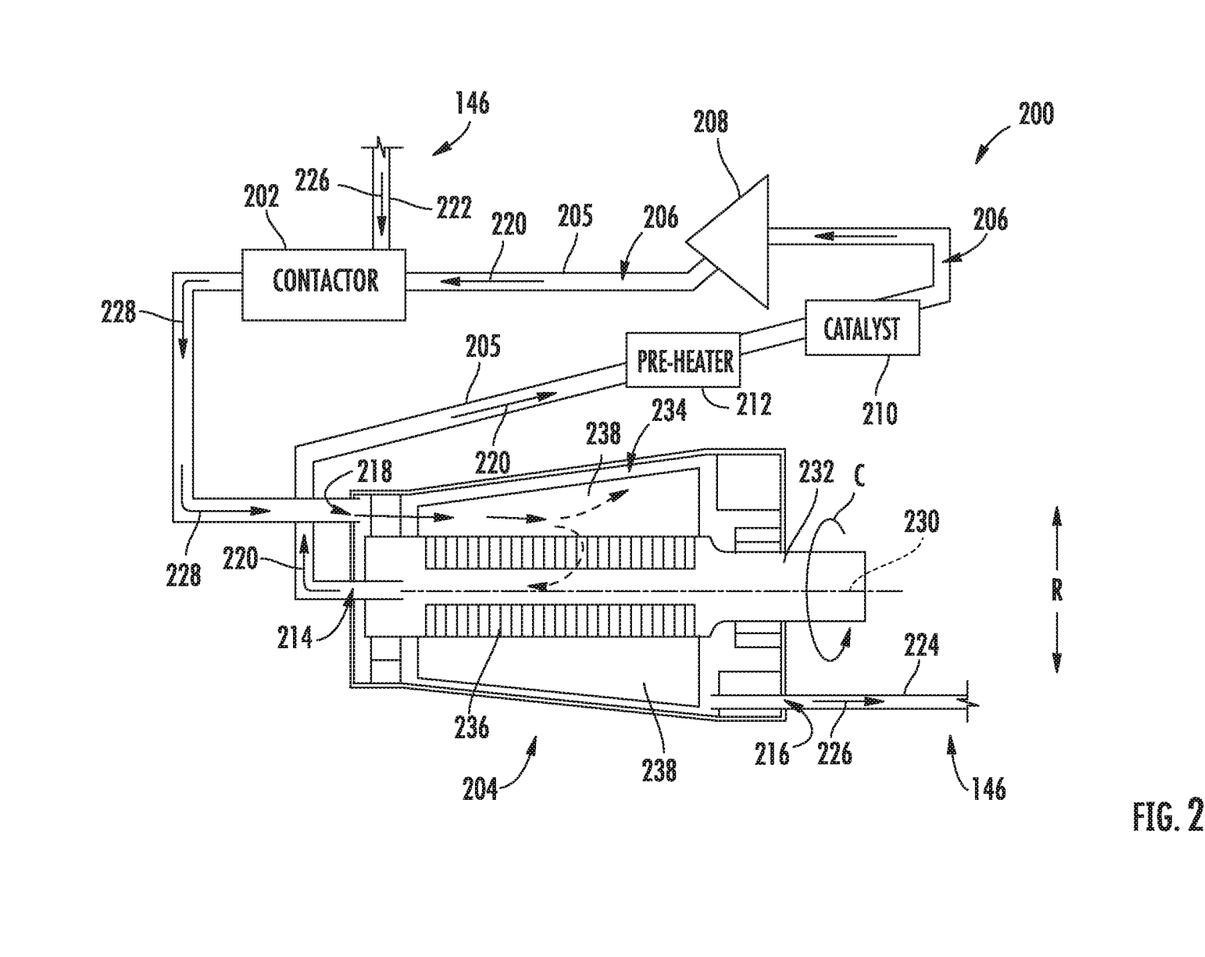
FIG. 2 is a schematic view of a fuel oxygen conversion unit in accordance with an exemplary embodiment of the present disclosure.

Referring now to FIG. 2, a schematic drawing of a fuel oxygen conversion unit 200 for a gas turbine engine in accordance with an exemplary aspect of the present disclosure is provided. In at least certain exemplary embodiments, the exemplary fuel oxygen conversion unit 200 depicted in FIG. 2 may be incorporated into, e.g., the exemplary engine 100 described above with reference to FIG. 1 (e.g., may be the fuel oxygen conversion unit 144 depicted in FIG. 1 and described above).

As will be appreciated from the discussion herein, the fuel oxygen conversion unit 200 of FIG. 2 generally includes a contactor 202 and a dual separator pump 204. The exemplary contactor 202 depicted may be configured in any suitable manner to substantially mix a received gas and liquid flow, as will be described below. For example, the contactor 202 may, in certain embodiments be a mechanically driven contactor (e.g., having paddles for mixing the received flows), or alternatively may be a passive contactor for mixing the received flows using, at least in part, a pressure and/or flowrate of the received flows. For example, a passive contactor may include one or more tabulators, a venturi mixer, etc.

Moreover, the exemplary fuel oxygen conversion unit 200 includes a stripping gas line 205, and more particularly, includes a plurality of stripping gas lines 205, which together at least in part define a circulation gas flowpath 206 extending from the dual separator pump 204 to the contactor 202. In certain exemplary embodiments, the circulation gas flowpath 206 may be formed of any combination of one or more conduits, tubes, pipes, etc. in addition to the plurality stripping gas lines 205 and structures or components within the circulation gas flowpath 206.

As will be explained in greater detail, below, the fuel oxygen conversion unit 200 generally provides for a flow of stripping gas 220 through the plurality of stripping gas lines 205 and stripping gas flowpath 206 during operation. It will be appreciated that the term "stripping gas" is used herein as a term of convenience to refer to a gas generally capable of performing the functions described herein. The stripping gas 220 flowing through the stripping gas flowpath/circulation gas flowpath 206 may be an actual stripping gas functioning to strip oxygen from the fuel within the contactor, or alternatively may be a sparging gas bubbled through a liquid fuel to reduce an oxygen content of such fuel. For example, as will be discussed in greater detail below, the stripping gas 220 may be an inert gas, such as Nitrogen or Carbon Dioxide ($CO_2$), a gas mixture made up of at least 50% by mass inert gas, or some other gas or gas mixture having a relatively low oxygen content.

Moreover, for the exemplary oxygen conversion unit depicted in FIG. 2, the fuel oxygen conversion unit 200 further includes a gas boost pump 208, a catalyst 210, and a pre-heater 212. For the embodiment shown, the gas boost pump 208, the catalyst 210, and the pre-heater 212 are each arranged within the circulation gas flowpath 206 in series flow. Additionally, the gas boost pump 208 may be configured as a rotary gas pump coupled to, and driven by, a power source (not shown). In certain embodiments, the power source for the gas boost pump 208 may be the same power source for the dual separator pump 204 (discussed below), or alternatively, may be any other suitable power source. For example, in certain embodiments, the gas boost pump 208 may be coupled to an accessory gearbox 142 (see FIG. 1), a suitable electrical power source, etc.

Referring still to the embodiment of FIG. 2, it will be appreciated that the dual separator pump 204 generally defines a gas outlet 214, a liquid fuel outlet 216, and an inlet 218. It will also be appreciated that the exemplary fuel oxygen conversion unit 200 depicted is operable with a fuel delivery system 146, such as a fuel delivery system 146 of the gas turbine engine including the fuel oxygen conversion unit 200 (see, e.g., FIG. 1). The exemplary fuel delivery system 146 generally includes a plurality of fuel lines, and in particular, an inlet fuel line 222 and an outlet fuel line 224. The inlet fuel line 222 is fluidly connected to the contactor 202 for providing a flow of liquid fuel 226 to the contactor 202 (e.g., from a fuel source, such as a fuel tank) and the outlet fuel line 224 is fluidly connected to the liquid fuel outlet 216 of the dual separator pump 204 for receiving a flow of deoxygenated liquid fuel 226.

Moreover, during typical operations, a flow of stripping gas 220 flows through the circulation gas flowpath 206 from the gas outlet 214 of the dual separator pump 204 to the contactor 202. More specifically, during typical operations, stripping gas 220 flows from the gas outlet 214 of the dual separator pump 204, through the pre-heater 212 (configured to add heat energy to the gas flowing therethrough), through the catalyst 210, and to/through the gas boost pump 208, wherein a pressure of the stripping gas 220 is increased to provide for the flow of the stripping gas 220 through the circulation gas flowpath 206. The relatively high pressure stripping gas 220 (i.e., relative to a pressure upstream of the boost pump 208 and the fuel entering the contactor 202) is then provided to the contactor 202, wherein the stripping gas 220 is mixed with the flow of liquid fuel 226 from the inlet fuel line 222 to generate a fuel gas mixture 228. The fuel gas mixture 228 generated within the contactor 202 is provided to the inlet 218 of the dual separator pump 204.

Generally, it will be appreciated that during operation of the fuel oxygen conversion unit 200, the liquid fuel 226 provided through the inlet fuel line 222 to the contactor 202 may have a relatively high oxygen content. The stripping gas 220 provided to the contactor 202 may have a relatively low oxygen content or other specific chemical structure. Within the contactor 202, the liquid fuel 226 is mixed with the stripping gas 220, resulting in the fuel gas mixture 228. As a result of such mixing a physical exchange may occur whereby at least a portion of the oxygen within the fuel 226 is transferred to the stripping gas 220, such that the fuel component of the mixture 228 has a relatively low oxygen content (as compared to the fuel 226 provided through inlet fuel line 222) and the stripping gas component of the mixture 228 has a relatively high oxygen content (as compared to the stripping gas 220 provided through the circulation gas flowpath 206 to the contactor 202).

Within the dual separator pump 204 the relatively high oxygen content stripping gas 220 is then separated from the relatively low oxygen content fuel 226 back into the respective flows of stripping gas 220 and liquid fuel 226. Specifically, for the embodiment shown, the dual separator pump 204 defines a central axis 230, radial direction R, and a circumferential direction C extending about the central axis 230. Additionally, the dual separator pump 204 is configured as a mechanically-driven dual separator pump, or more specifically as a rotary/centrifugal dual separator pump. Accordingly, the dual separator pump 204 includes an input shaft 232 and a single-stage separator/pump assembly 234. The input shaft 232 is mechanically coupled to the single-stage separator/pump assembly 234, and the two components are together rotatable about the central axis 230. Further, the input shaft 232 may be mechanically coupled to, and driven by, e.g., an accessory gearbox (such as the exemplary accessory gearbox 142 of FIG. 1). However, in other embodiments, the input shaft 232 may be mechanically coupled to any other suitable power source, such as an electric motor. As will be appreciated, the single-stage separator/pump assembly 234 may simultaneously separate the mixture 228 back into the flows of stripping gas 220 and liquid fuel 226 from the mixture 228 and increase a pressure of the separated liquid fuel 226 (as will be discussed in greater detail below).

Additionally, the exemplary single-stage separator/pump assembly 234 depicted generally includes an inner gas filter 236 arranged along the central axis 230, and a plurality of paddles 238 positioned outward of the inner gas filter 236 along the radial direction R. During operation, a rotation of the single-stage separator/pump assembly 234 about the central axis 230, and more specifically, a rotation of the plurality of paddles 238 about the central axis 230 (i.e., in the circumferential direction C), may generally force heavier liquid fuel 226 outward along the radial direction R and lighter stripping gas 220 inward along the radial direction R through the inner gas filter 236. In such a manner, the liquid fuel 226 may exit through the liquid fuel outlet 216 of the dual separator pump 204 and the stripping gas 220 may exit through the gas outlet 214 of the dual separator pump 204, as is indicated.

Further, it will be appreciated that with such a configuration, the liquid fuel 226 exiting the dual separator pump 204 through the liquid fuel outlet 216 may be at a higher pressure than the liquid fuel 226 provided through inlet fuel line 222, and further higher than the fuel/gas mixture 228 provided through the inlet 218. Such may be due at least in part to the centrifugal force exerted on such liquid fuel 226 and the rotation of the plurality of paddles 238. Additionally, it will be appreciated that for the embodiment depicted, the liquid fuel outlet 216 is positioned outward of the inlet 218 (i.e., the fuel gas mixture inlet) along the radial direction R. Such may also assist with the increasing of the pressure of the liquid fuel 226 provided through the liquid fuel outlet 216 of the dual separator pump 204.

For example, it will be appreciated that with such an exemplary embodiment, the dual separator pump 204 of the fuel oxygen conversion unit 200 may generate a pressure rise in the fuel flow during operation. As used herein, the term "pressure rise" refers to a net pressure differential between a pressure of the flow of liquid fuel 226 provided to the liquid fuel outlet 216 of the dual separator pump 204 (i.e., a "liquid fuel outlet pressure") and a pressure of the liquid fuel 226 provided through the inlet fuel line 222 to the contactor 202. In at least certain exemplary embodiments, the pressure rise of the liquid fuel 226 may be at least about sixty (60) pounds per square inch ("psi"), such as at least about ninety (90) psi, such as at least about one hundred (100) psi, such as up to about seven hundred and fifty (750) psi. With such a configuration, it will be appreciated that in at least certain exemplary embodiments of the present disclosure, the liquid fuel outlet pressure may be at least about seventy (70) psi during operation. For example, in at least certain exemplary embodiments, the liquid fuel out of pressure may be at least about one hundred (100) psi during operation, such as at least about one hundred and twenty-five (125) psi during operation, such as up to about eight hundred (800) psi during operation. Additional details about these dual functions of the dual separator pump 204 will be discussed below with reference to FIG. 3.

Further, it will be appreciated that the liquid fuel 226 provided to the liquid fuel outlet 216, having interacted with the stripping gas 220, may have a relatively low oxygen content, such that a relatively high amount of heat may be added thereto with a reduced risk of the fuel coking (i.e., chemically reacting to form solid particles which may clog up or otherwise damage components within the fuel flow path). For example, in at least certain exemplary aspects, the fuel 226 provided to the liquid fuel outlet 216 may an oxygen content of less than about five (5) parts per million ("ppm"), such as less than about three (3) ppm, such as less than about two (2) ppm, such as less than about one (1) ppm, such as less than about 0.5 ppm.

Moreover, as will be appreciated, the exemplary fuel oxygen conversion unit 200 depicted recirculates and reuses the stripping gas 220 (i.e., the stripping gas 220 operates in a substantially closed loop). However, the stripping gas 220 exiting the dual separator pump 204, having interacted with the liquid fuel 226, has a relatively high oxygen content. Accordingly, in order to reuse the stripping gas 220, an oxygen content of the stripping gas 220 from the outlet 214 of the dual separator pump needs to be reduced. For the embodiment depicted, and as noted above, the stripping gas 220 flows through the pre-heater 212, through the catalyst 210 where the oxygen content of the stripping gas 220 is reduced, and through the gas boost pump 208. More specifically, within the catalyst 210 the relatively oxygen-rich stripping gas 220 is reacted to reduce the oxygen content thereof. It will be appreciated that catalyst 210 may be configured in any suitable manner to perform such functions. For example, in certain embodiments, the catalyst 210 may be configured to combust the relatively oxygen-rich stripping gas 220 to reduce an oxygen content thereof. However, in other embodiments, the catalyst 210 may additionally, or alternatively, include geometries of catalytic components through which the relatively oxygen-rich stripping gas 220 flows to reduce an oxygen content thereof. In one or more of these configurations, a byproduct may be produced, such as water, which may be ducted away from the catalyst 210 (duct not depicted in the embodiment of FIG. 2). In one or more of these embodiments, the catalyst 210 may be configured to reduce an oxygen content of the stripping gas 220 to less than about five percent (5%) oxygen (O2) by mass, such less than about two (2) percent (3%) oxygen (O2) by mass, such less than about one percent (1%) oxygen (O2) by mass.

The resulting relatively low oxygen content gas is then provided through the remainder of the circulation gas flowpath 206 and back to the contactor 202, such that the cycle may be repeated. In such a manner, it will be appreciated that the stripping gas 220 may be any suitable gas capable of undergoing the chemical transitions described above. For example, the stripping gas may be air from, e.g., a core air flowpath of a gas turbine engine including the fuel oxygen conversion unit 200 (e.g., compressed air bled from an HP compressor 112; see FIG. 1). However, in other embodiments, the stripping gas may instead be any other suitable gas, such as an inert gas, such as Nitrogen or Carbon Dioxide (CO2), a gas mixture made up of at least 50% by mass inert gas, or some other gas or gas mixture having a relatively low oxygen content.

It will be appreciated, however, that the exemplary fuel oxygen conversion unit 200 described above is provided by way of example only. In other embodiments, the fuel oxygen conversion unit 200 may be configured in any other suitable manner. For example, in other embodiments, the stripping gas 220 may not flow through a circulation gas flowpath 206, and instead the fuel oxygen conversion unit 200 include an open loop stripping gas flowpath, with such flowpath in flow communication with a suitable stripping gas source, such as a bleed air source, and configured to dump such air to the atmosphere downstream of the fuel gas separator 204.

Figure 3:
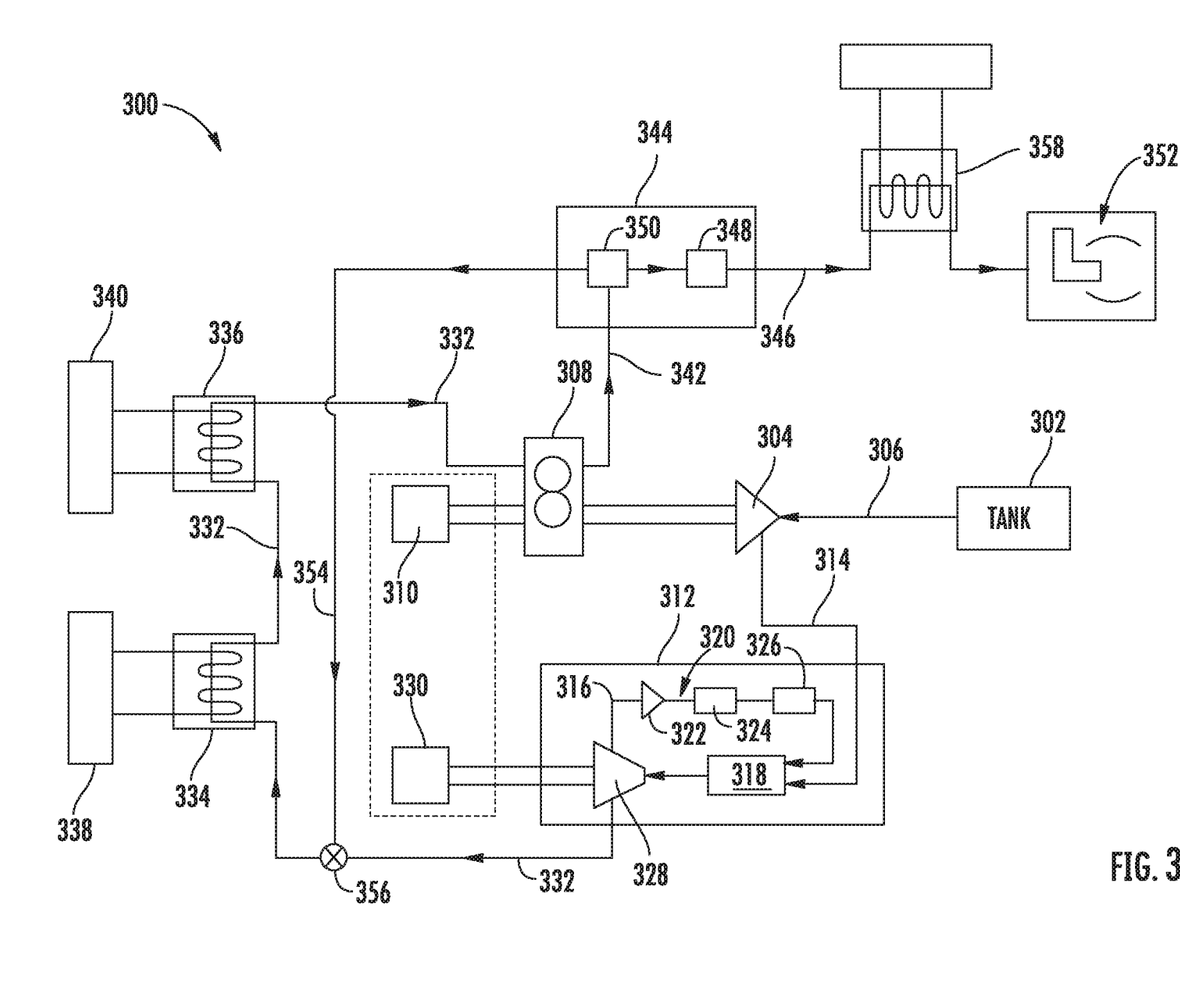
FIG. 3 is a schematic view of a fuel delivery system incorporating a fuel oxygen conversion unit in accordance with an exemplary embodiment of the present disclosure.

Referring now to FIG. 3, a schematic diagram is provided of a fuel delivery system 300 for a gas turbine engine in accordance with an exemplary embodiment of the present disclosure. In certain exemplary embodiments, the exemplary fuel delivery system 300 depicted in FIG. 3 may be utilized with the exemplary gas turbine engine described above with reference to FIG. 1 (i.e., configured as the exemplary fuel delivery system 142, operable with the exemplary turbofan engine 100), and/or may be configured as the exemplary fuel oxygen conversion unit 200 described above with reference to FIG. 2. However, in other embodiments, the fuel delivery system 300 may be utilized with any other suitable gas turbine engine, vehicle (including, e.g., an aircraft), etc.

As is depicted, the fuel delivery system 300 generally includes a fuel tank 302, a draw pump 304, and a first fuel line 306 extending between the fuel tank 302 and the draw pump 304. The draw pump 304 may refer to the first pump located downstream of the fuel tank 302 for generating a fuel flow from the fuel tank 302. Accordingly, the draw pump 304 depicted is positioned downstream of the fuel tank 302 for generating a flow of liquid fuel through the first fuel line 306 from the fuel tank 302 (note that fuel flow directions through the fuel delivery system of FIG. 3 are indicated schematically as arrows on the respective fuel lines). When the exemplary fuel delivery system 300 is utilized with a gas turbine engine of an aircraft, the fuel tank 302 may be, for example, positioned within one of the wings of the aircraft, within a fuselage of the aircraft, or any other suitable location.

The fuel delivery system 300 further includes, as will be discussed in greater detail below, a main fuel pump 308 positioned downstream of the draw pump 304. The main fuel pump 308 may refer to a fuel pump for providing pressurized fuel flow to the components for combusting such fuel (i.e., providing the last pressure rise upstream of such components combusting the fuel, as will be described in more detail below). For the embodiment depicted, the main fuel pump 308 is mechanically coupled to a first power source 310, and the draw pump 304 is mechanically coupled to and rotatable with the main fuel pump 308. In such a manner, the main fuel pump 308 and the draw pump 304 may share the first power source 310. For example, in certain embodiments, the first power source 310 may be a first pad of an accessory gearbox of the gas turbine engine (see, e.g. accessory gearbox 142 of FIG. 1). However, in other embodiments, the draw pump 304 may be powered by an independent power source relative to the main fuel pump 308. Further, in other embodiments, one or both of the draw pump 304 and main fuel pump 308 may be powered by any other suitable power source.

The exemplary fuel system of FIG. 3 further includes a fuel oxygen conversion unit 312 and a second fuel line 314. The fuel oxygen conversion unit 312 generally includes a stripping gas line 316 and a contactor 318. More specifically, the fuel oxygen conversion unit 312 defines a circulation gas flowpath 320, with the stripping gas line 316 defining at least in part the circulation gas flowpath 320. The contactor 318 is in fluid communication with the stripping gas line 316 (and circulation gas flowpath 320) and the draw pump 304 (through the second fuel line 314 for the embodiment shown) for forming a fuel/gas mixture. Notably, for the embodiment depicted, the exemplary fuel oxygen conversion unit 312 further includes a gas boost pump 322, a preheater 324, and a catalyst 326, each arranged in series within the circulation gas flowpath 320. These components may be configured to provide the stripping gas through the circulation gas flowpath 320 and stripping gas line 316 with the desired properties to mix with the with fuel within the contactor 318 to reduce an oxygen content of the fuel.

Further, the exemplary fuel oxygen conversion unit 312 further includes a dual separator pump 328 in fluid communication with the contactor 318 for receiving the fuel/gas mixture from the contactor 318 and separating the fuel/gas mixture back into a stripping gas flow and a liquid fuel flow at a location upstream of the main fuel pump 308. Notably, the fuel oxygen conversion unit 312 and exemplary dual separator pump 328 of FIG. 3 may be configured in substantially the same manner as the exemplary fuel oxygen conversion unit 200 and dual separator pump 204 described above with reference to FIG. 2. In such a manner, it will be appreciated that the dual separator pump 328 is a mechanically-driven dual separator pump 328 coupled to a second power source 330. For the embodiment of FIG. 3, the second power source 330 may be a second pad of an accessory gearbox. In such a manner, the dual separator pump 328 and main fuel pump 308 (as well as the draw pump 304 for the embodiment shown) may each be driven by, e.g., an accessory gearbox. However, it will be appreciated, that for the embodiment depicted the main fuel pump 308 and dual separator pump 328 may be coupled to different pads of the accessory gearbox, such that they may be rotated at different rotational speeds.

It will be appreciated, however, that in other exemplary embodiments, the fuel oxygen conversion unit 312 may have any other suitable configuration. For example, in other embodiments, the fuel oxygen conversion unit 312 may have any other suitable dual separator pump 328, may have its components arranged in any other suitable flow order, may not include each of the components depicted, may include components configured in any other suitable manner, or may include other components not depicted or described herein.

Referring still to the embodiment of FIG. 3, as with the exemplary dual separator pump 204 described above with reference to FIG. 2, the dual separator pump 328 depicted in FIG. 3 is further configured to generate a pressure rise in the fuel flow of least about sixty (60) psi, such as at least ninety (90) psi and up to about seven hundred and fifty (750) psi. In such a manner, a liquid fuel outlet pressure generated by the dual separator pump 328 may be at least about seventy (70) psi, or greater. Such may be accomplished in certain exemplary embodiments through a single stage separator/pump assembly (see, e.g., assembly 234 of FIG. 2).

With such an increase in pressure in the fuel flow through the dual separator pump 328 of the fuel oxygen conversion unit 312, the dual separator pump 328 of the fuel oxygen conversion unit 312 depicted may provide substantially all of a necessary pressure rise of the fuel flow within the fuel delivery system 300 downstream of the draw pump 304 and upstream of the main fuel pump 308. Such is the case with the exemplary fuel delivery system 300 depicted in FIG. 3. Accordingly, for the exemplary embodiment depicted, the dual separator pump 328 of the fuel oxygen conversion unit 312 effectively obviates a need for including a separate booster pump for the fuel flow through the fuel delivery system 300 downstream of the draw pump 304 and upstream of the main fuel pump 308. Such may reduce a cost and weight of the fuel delivery system 300.

In such a manner, it will further be appreciated that for the embodiment shown, substantially all of the fuel flow from the draw pump 304 to the main fuel pump 308 flows through the dual separator pump 328 of the fuel oxygen conversion unit 312. More specifically, for the exemplary embodiment depicted, substantially all of the fuel flow from the draw pump 304 to the main fuel pump 308 flows through the dual separator pump 328 of the fuel oxygen conversion unit 312 without option for bypass (i.e., no bypass lines around the dual separator pump 328 for the embodiment shown). Such may therefore ensure that the dual separator pump 328 of the fuel oxygen conversion unit 312 may provide a desired amount of pressure rise in the fuel flow between the draw pump 304 and the main fuel pump 308. Note, however, that in other exemplary aspects of the present disclosure, the fuel delivery system 300 may include one or more bypass lines and/or a fuel booster pump. However, with the inclusion of the dual separator pump 328, a size of any such fuel booster pump may not need to be as great.

From the fuel oxygen conversion unit 312, the flow of liquid fuel is provided to a third fuel line 332 of the fuel delivery system 300. The third fuel line 332 of the fuel delivery system 300 is in fluid communication with one or more engine system heat exchangers, each engine system heat exchanger thermally coupling the third fuel line 332 (or rather a fuel flow through the third fuel line 332) to a respective engine system. More specifically, for the embodiment shown, the third fuel line 332 is in thermal communication with a first engine system heat exchanger 334 and a second engine system heat exchanger 336. The first engine system heat exchanger 334 and second engine system heat exchanger 336 may be thermally coupled to a respective first engine system 338 and second engine system 340. The first and second engine systems 338, 340 may be any suitable engine system, such as one or more of a main lubrication oil system, a variable frequency generator system, etc.

The third fuel line 332 further extends to the main fuel pump 308, such that the aforementioned one or heat exchangers 334, 336 are positioned upstream of the main fuel pump 308 and downstream of the fuel oxygen conversion unit 312. The main fuel pump 308 may further increase a pressure of the fuel flow from the third fuel line 332 and provide such relatively high pressure fuel flow through a fourth fuel line 342 of the fuel delivery system 300. Notably, the exemplary fuel delivery system 300 further includes a fuel metering unit 344 and a fifth fuel line 346. For the embodiment depicted, the fourth fuel line 342 extends to the fuel metering unit 344 of the fuel delivery system 300. The exemplary fuel metering unit 344 generally includes a fuel metering valve 348 and a bypass valve 350. The fuel metering valve 348 is positioned downstream the bypass valve 350 for the embodiment shown, but these positions may be reversed. The fuel metering valve 348 may be configured to meter a fuel flow provided to and through the fifth fuel line 346 to, e.g., a combustion device. More specifically, for the embodiment depicted, the fifth fuel line 346 is configured to provide fuel flow to one or more combustor assemblies 352 (which may be, e.g., within a combustion section of a gas turbine engine; see, e.g., FIG. 1). In such a manner, the fuel metering valve 348 may control operations of, e.g., a gas turbine engine including the one or more combustion assemblies 352 by modulating a fuel flow to such combustor assemblies 352. Accordingly, it will be appreciated that the bypass valve 350 of the fuel metering unit 344 may return fuel flow to a location upstream of the fuel metering unit 344 when such fuel is not required or desired by the combustion device (as dictated by the fuel metering valve 348). Specifically, for the embodiment shown, the bypass valve 350 is configured to return such fuel through a sixth fuel line 354 of fuel delivery system 300 to a juncture 356 in the third fuel line 332 upstream of the one or heat exchangers (i.e., heat exchangers 334, 336 for the embodiment depicted).

Briefly, it will also be appreciated that for the embodiment shown, the fuel delivery system 300 includes a third heat exchanger 358 positioned downstream of the fuel metering unit 344 and upstream of the combustor assemblies 352. The third heat exchanger 358 may also be an engine system heat exchanger configured to thermally connected the fuel flow through the fifth fuel line 346 to such engine system (i.e., a third engine system 360). The third engine system 360 thermally coupled to the third heat exchanger 358 may be the same as one of the engine systems 338, 340 described above, or alternatively, may be any other suitable engine system.

In such a manner, it will be appreciated that inclusion of the fuel oxygen conversion unit 312 having a dual separator pump 328 as described herein and positioned in the manner described herein may allow for more efficient fuel delivery system 300. For example, providing the fuel oxygen conversion unit 312 downstream of the draw pump 304 and upstream of the main fuel pump 308, heat may be added to the deoxygenated fuel upstream of the main fuel pump 308 (as well as downstream of the main fuel pump 308). Further, inclusion of a dual separator pump 328 in accordance with an embodiment described herein may allow for a reduction in size of a boost pump, or an elimination of such a boost pump (such as in the embodiment depicted), potentially saving costs and weight of the fuel delivery system 300.

Figure 4:
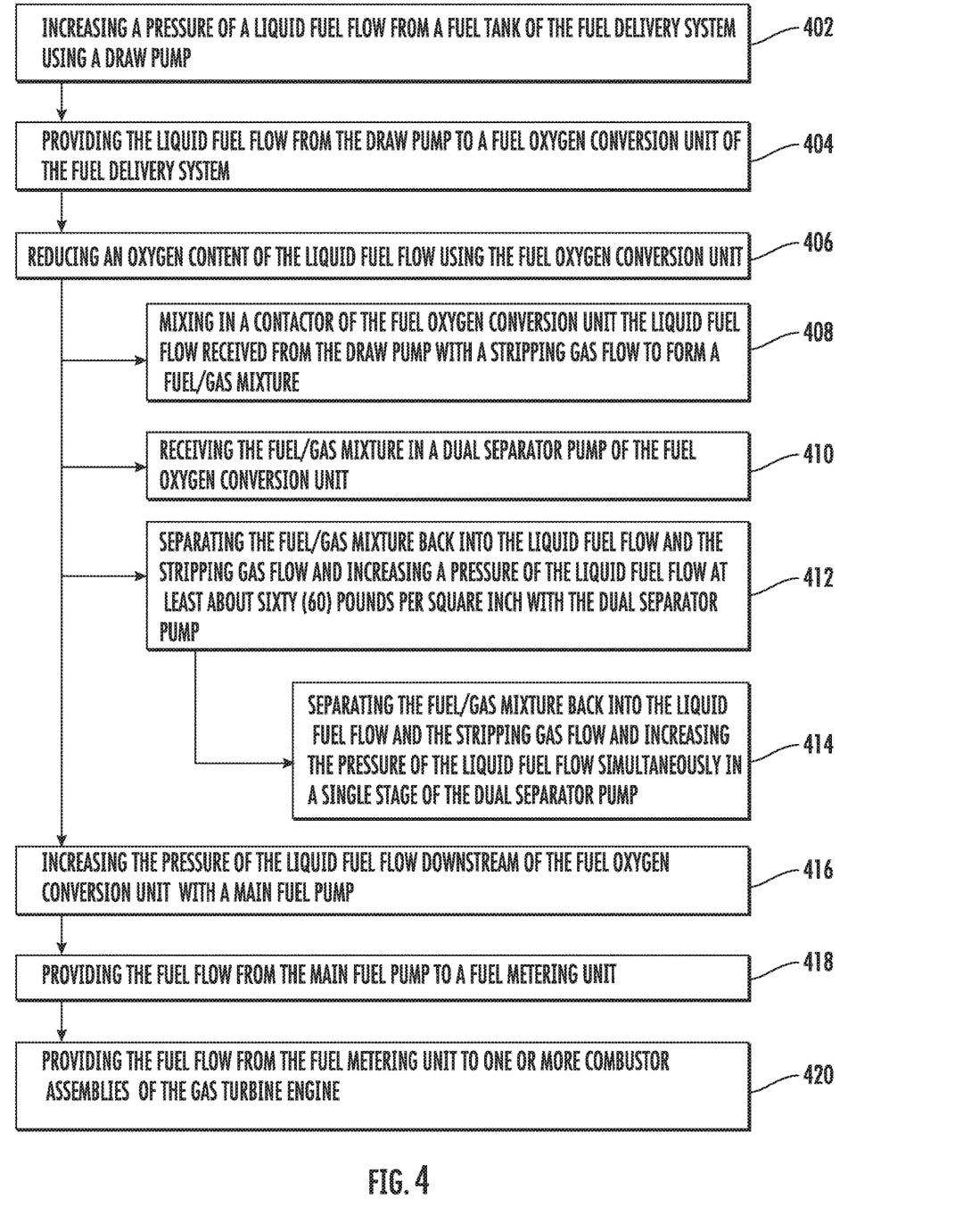
FIG. 4 is a flow diagram of a method for operating a fuel oxygen conversion unit in accordance with an exemplary aspect of the present disclosure.

Referring now to FIG. 4, a method 400 for operating a fuel delivery system for a gas turbine engine in accordance with an exemplary aspect of the present disclosure is depicted. The exemplary method 400 may be utilized to operate one or more of the exemplary fuel delivery systems described above with reference to FIGS. 1 through 3.

For the exemplary aspect of FIG. 4, the method 400 generally includes at (402) increasing a pressure of a liquid fuel flow from a fuel tank of the fuel delivery system using a draw pump. The method 400 further includes at (404) providing the liquid fuel flow from the draw pump to a fuel oxygen conversion unit of the fuel delivery system. For the exemplary aspect depicted, the method 400 further includes at (406) reducing an oxygen content of the liquid fuel flow using the fuel oxygen conversion unit.

More specifically, for the exemplary aspect depicted, reducing the oxygen content of the liquid fuel flow at (406) includes at (408) mixing in a contactor of the fuel oxygen conversion unit the liquid fuel flow received from the draw pump with a stripping gas flow to form a fuel/gas mixture, and at (410) receiving the fuel/gas mixture in a dual separator pump of the fuel oxygen conversion unit. Further for the exemplary aspect depicted, reducing the oxygen content of the liquid fuel flow at (406) includes at (412) separating the fuel/gas mixture back into the liquid fuel flow and the stripping gas flow and increasing a pressure of the liquid fuel flow at least about sixty (60) pounds per square inch with the dual separator pump. For the exemplary aspect depicted, separating the fuel/gas mixture back into the liquid fuel flow and the stripping gas flow and increasing the pressure of the liquid fuel flow at (412) includes at (414) separating the fuel/gas mixture back into the liquid fuel flow and the stripping gas flow and increasing the pressure of the liquid fuel flow simultaneously in a single stage of the dual separator pump. For example, in at least certain exemplary embodiments, the method 400 may use one or more of the exemplary embodiments described above with reference to FIG. 2 to separate the fuel/gas mixture back into the respective flows and increase the pressure of the liquid fuel flow simultaneously in a single stage of the dual separator pump at (414) (see, e.g., the separation assembly 234 of the dual separator pump 204 of FIG. 2, configured as a single stage for simultaneously separating the flows).

Referring still to FIG. 4, the exemplary method 400 includes at (416) increasing the pressure of the liquid fuel flow downstream of the fuel oxygen conversion unit with a main fuel pump; at (418) providing the fuel flow from the main fuel pump to a fuel metering unit; and at (420) providing the fuel flow from the fuel metering unit to one or more combustor assemblies of the gas turbine engine. Notably, with the exemplary aspect depicted, separating the fuel/gas mixture and increasing the pressure of the liquid fuel flow at (412) further includes at (422) providing substantially all of a pressure rise of the liquid fuel flow between the draw pump and the main fuel pump. In such an exemplary aspect, the dual separator pump may act as a booster pump for the fuel delivery system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. A method for operating a system, the system comprising:
 a gas turbine engine; and
 a fuel delivery system coupled to the gas turbine engine, the fuel delivery system comprising:

a draw pump disposed downstream of a fuel tank for generating a liquid fuel flow from the fuel tank; and
a fuel oxygen conversion unit comprising:
a contactor defining a liquid fuel inlet for receiving the liquid fuel flow from the draw pump, a stripping gas inlet for receiving a stripping gas flow, and an outlet, wherein the liquid fuel inlet is disposed downstream from and fluidly coupled to the draw pump, the contactor configured to form a fuel/gas mixture;
a dual separator pump positioned downstream from the contactor, the dual separator pump comprising an inlet in fluid communication with the contactor for receiving the fuel/gas mixture, a liquid fuel outlet fluidly coupled to a combustion section of the gas turbine engine, and a stripping gas outlet, wherein the dual separator pump is configured to separate the fuel/gas mixture back into the stripping gas flow and the liquid fuel flow and provide the stripping gas flow to the stripping gas outlet and the liquid fuel flow to the liquid fuel outlet, wherein the dual separator pump defines a pressure differential between the liquid fuel flow at the liquid fuel outlet and the liquid fuel flow at the liquid fuel inlet of the contactor of at least 60 pounds per square inch, and wherein the draw pump is configured to provide the liquid fuel flow to the contactor; and
a boost pump comprising an inlet fluidly coupled to the stripping gas outlet of the dual separator pump, and a boost pump outlet fluidly coupled to the stripping gas inlet of the contactor, wherein the boost pump outlet is disposed upstream from the stripping gas inlet of the contactor, the boost pump is configured to exhaust gas from the boost pump outlet at a first pressure, and the stripping gas inlet of the contactor receives gas from the boost pump outlet at substantially the first pressure;
the method comprising:
mixing, in the contactor, the liquid fuel flow received from the draw pump with the stripping gas flow to form the fuel/gas mixture;
receiving the fuel/gas mixture in the dual separator pump; and
separating the fuel/gas mixture back into the liquid fuel flow and the stripping gas flow and increasing the pressure of the liquid fuel flow at least 60 pounds per square inch with the dual separator pump.

2. The method of claim 1, further comprising:
increasing the pressure of the liquid fuel flow from a fuel tank using the draw pump; and
increasing the pressure of the liquid fuel flow downstream of the fuel oxygen conversion unit with a main fuel pump;
wherein separating the fuel/gas mixture back into the liquid fuel flow and the stripping gas flow and increasing the pressure of the liquid fuel flow comprises providing substantially all of a pressure rise of the liquid fuel flow between the draw pump and the main fuel pump.

3. The method of claim 1, wherein separating the fuel/gas mixture back into the liquid fuel flow and the stripping gas flow and increasing the pressure of the liquid fuel flow comprises separating the fuel/gas mixture back into the liquid fuel flow and the stripping gas flow and increasing the pressure of the liquid fuel flow with the dual separator pump simultaneously in a single stage of the dual separator pump.

4. A system comprising:
a gas turbine engine; and
a fuel delivery system coupled to the gas turbine engine, the fuel delivery system comprising:
a fuel oxygen conversion unit comprising:
a contactor comprising a liquid fuel inlet, a gas inlet, and an outlet, wherein the liquid fuel inlet is fluidly coupled to a liquid fuel supply;
a dual separator pump positioned downstream from the contactor to receive a mixture of fuel and gas from the contactor, the dual separator pump comprising an inlet fluidly coupled to the outlet of the contactor, a gas outlet, and a liquid fuel outlet fluidly coupled to a combustion section of the gas turbine engine; and
a boost pump comprising an inlet fluidly coupled to the gas outlet of the dual separator pump, and a boost pump outlet fluidly coupled to the gas inlet of the contactor, wherein the boost pump outlet is disposed upstream from the gas inlet of the contactor, the boost pump is configured to exhaust gas from the boost pump outlet at a first pressure, and the gas inlet of the contactor receives gas from the boost pump outlet at substantially the first pressure.

5. The system of claim 1, wherein the dual separator pump defines a liquid fuel outlet pressure during operation, wherein the liquid fuel outlet pressure is at least 70 pounds per square inch.

6. The system of claim 1, further comprising a draw pump in fluid communication with the liquid fuel supply and disposed upstream from the liquid fuel inlet of the contactor, and a main fuel pump disposed downstream from the liquid fuel outlet of the dual separator pump, wherein the dual separator pump provides substantially all of a pressure rise of a flow of a liquid fuel flowing out the liquid fuel outlet upstream of the main fuel pump.

7. The system of claim 1, wherein the dual separator pump is configured to generate a pressure rise in the fuel flow of at least 60 pounds per square inch.

8. The system of claim 1, wherein the dual separator pump comprises a single stage separator/pump assembly.

9. The system of claim 1, wherein the dual separator pump is a rotary pump defining an axis and a radial direction, wherein the dual separator pump comprises a gas filter extending generally along the axis and a plurality of paddles positioned outward of the gas filter along the radial direction and rotatable about the axis.

10. The system of claim 1, wherein the dual separator pump defines a radial direction and the liquid fuel outlet is positioned outward of the inlet of the dual separator pump along the radial direction.

11. The system of claim 6, wherein the draw pump is mechanically coupled to and rotatable with the main fuel pump via a shaft, wherein the shaft is rotatably driven by a power source.

12. The system of claim 6, wherein substantially all of the liquid fuel flow from the draw pump to the main fuel pump flows through the dual separator pump.

13. The system of claim 6, wherein substantially all of the liquid fuel flow from the draw pump to the main fuel pump flows through the dual separator pump without option for bypass.

14. The system of claim 1, further comprising a preheater and a catalyst fluidly coupled to and disposed in serial flow order between the gas outlet of the dual separator pump and the boost pump inlet.

15. A system for a gas turbine engine comprising:
a gas turbine engine; and
a fuel delivery system coupled to the gas turbine engine, the fuel delivery system comprising:
- a draw pump disposed downstream of a fuel tank for generating a liquid fuel flow from the fuel tank; and
- a fuel oxygen conversion unit comprising:
  - a contactor comprising a liquid fuel inlet, a gas inlet, and an outlet, wherein the liquid fuel inlet is disposed downstream from and fluidly coupled to the draw pump;
  - a dual separator pump positioned downstream from the contactor to receive a mixture of fuel and gas from the contactor, the dual separator pump comprising an inlet fluidly coupled to the outlet of the contactor, a gas outlet, and a liquid fuel outlet fluidly coupled to a combustion section of the gas turbine engine; and
  - a boost pump comprising an inlet fluidly coupled to the gas outlet of the dual separator pump, and a boost pump outlet fluidly coupled to the gas inlet of the contactor, wherein the boost pump outlet is disposed upstream from the gas inlet of the contactor, the boost pump is configured to exhaust gas from the boost pump outlet at a first pressure, and the gas inlet of the contactor receives gas from the boost pump outlet at substantially the first pressure;
  - wherein the dual separator pump defines a pressure differential between the liquid fuel flow at the liquid fuel outlet and the liquid fuel flow at the liquid fuel inlet of the contactor of at least 60 pounds per square inch.

16. The system of claim 15, wherein the dual separator pump comprises a single stage separator/pump assembly.

17. The system of claim 15, further comprising:
a main fuel pump, wherein the fuel oxygen conversion unit is positioned downstream of the draw pump and upstream of the main fuel pump.

18. The system of claim 17, wherein the dual separator pump provides substantially all of a pressure rise of the liquid fuel flow between the draw pump and the main fuel pump.

19. The system of claim 15, wherein the pressure differential is at least 90 pounds per square inch and up to 750 pounds per square inch.

20. The system of claim 15, wherein the dual separator pump is a mechanically-driven dual separator pump.

* * * * *